Patented Oct. 19, 1954

2,692,246

UNITED STATES PATENT OFFICE 2,692,246

MOLD MAKING COMPOSITION

Frank W. Less, Kenmore, Eugene C. Roeck, Buffalo, and Jay C. Searer, Kenmore, N. Y., assignors to Durez Plastics & Chemicals, Inc., North Tonawanda, N. Y., a corporation of New York No Drawing. Application April 12, 1951,
Serial No. 220,701

12 Claims. (Cl. 260—38)

The invention relates to the making of molds and more especially to a new composition for use in such molds.

In FIAT Final Report No. 1168, "The C Process of Making Molds and Cores for Foundry Use," by William W. McCulloch, Office of Technical Services, May 30, 1947, there is described a process for making foundry molds which utilizes a mixture of sand and a thermo-setting resin, specifically a mixture of phenolic resin and hexamethylenetetramine. While this procedure has many advantages, it is also attended with certain difficulties. First, the mixing of the powdered sand and resin is a very dusty operation, so that it can only be carried out safely by means of special equipment which is not available in the ordinary foundry. On the other hand, because the particles of sand are substantially larger than those of the resin, the mixture tends to stratify and become non-uniform if it is subjected to vibration, so that it cannot satisfactorily be made up elsewhere and shipped to the foundries, without danger of non-uniformity in the molds and in the castings made therefrom. Finally, the proper and uniform admixture of the different sized particles requires elaborate and expensive mixing equipment.

The primary object of the present invention is to provide a composition for the manufacture of molds according to the "C" process which is more satisfactory than those heretofore used therein.

A further object of the invention is to provide such a composition which can be produced and used without causing formation of dust, so that the dangers to health and safety involved in the manufacture of the known mixtures is eliminated.

Another object of the invention is to provide such a composition which can be rendered uniform without the need for special and complicated mixing equipment.

Still a further object of the invention is to provide such a composition which maintains its uniform distribution during handling and shipping, so that the need for mixing it in the foundry at the time of use is eliminated.

Still another object of the invention is to provide a method of preparing such a composition which is simple and economical.

Further objects and advantages of the invention will appear more fully from the following description.

We have found that the disadvantages of the prior compositions can be avoided if there is added to the sand, before the resin is mixed with it, an adhesion agent which will cause the resin particles to cling to the grains of sand. A composition in which the resin particles so adhere can be shipped or kept for long periods without substantial loss of uniformity. In producing the mixture, formation of dust is almost entirely eliminated.

The adhesion agent should be a material which is liquid at the temperature of application, which temperature should be lower than the quick setting temperature of the resin, that is, the temperature at which the resin will set within a short period of time. It is preferable to use compounds which are liquid at room temperature, but other compounds which require some heating may be used by heating the sand at the time the composition is formed.

The adhesion agent should also have a vapor pressure sufficiently low to avoid any substantial evaporation during mixing and storage. It should have a viscosity of at least 2 cp. at the temperature of application, and should be more viscous than water.

The adhesion agent must also be such that the final product is non-balling, that is, that, while the agent is wet enough to cause adhesion of the particles of resin to the sand, its nature and the quantity used are such that the final mixture is entirely free flowing. The mixture must not form lumps even under moderate pressure, over long periods of time. It should not feel wet to the touch, nor should it agglomerate when squeezed together.

Such a material cannot be cold molded. It is primarily intended for use in non-pressure molding, such as is described in our application entitled Method of Making Molds, Serial No. 220,700, executed of even date herewith.

It has been found that reaction products of phenol with compounds having an aromatic or hydroaromatic ring and an unsaturated side chain, such as styrene or limonene, are especially suitable as adhesion agents. These products, or mixtures containing substantial proportions thereof, must of course, as is explained above, be liquid at temperatures below the quick setting temperature of the resin, and must be sufficiently viscous and of low vapor pressure. The preferred adhesion agent is distyryl phenol, monostyryl phenol and other similar compounds are, however, also satisfactory.

The resin used in the process is preferably a phenol-aldehyde resin. Of course, this resin should not be completely set, and the mixture disclosed in the publication referred to above;

namely 9 parts of phenol formaldehyde resin with one part of hexamethylene tetramine, is satisfactory.

The quantity of adhesion agent may vary to a considerable extent. It should be sufficient, of course, to bind substantially all the resin to the sand, and insufficient to render the composition so fluid that it cannot be satisfactorily shaped. It is preferable to use about ¼% to 1% of the adhesion agent, based on the weight of the sand and resin.

The following examples indicate the improved results of the present invention:

Example 1

600 parts by weight of sand and 60 parts by weight of thermosetting resin, comprising a mixture of 90% phenolformaldehyde resin and 10% hexamethylene tetramine, powdered to a fineness of 200 mesh, are placed in a mixer. When the mixer is started, large clouds of resin dust are given off. Even after an impractically long mixing time, for example 10 minutes, there still exist streaks, indicating a nonuniform mixture. When the mixture is placed on a 200 mesh screen, 30 parts (50%) of the resin originally present pass through the screen with slight shaking, indicating the ease of separation of resin and sand.

Example 2

600 parts by weight of the same sand as used in Example 1 and 3 parts by weight of monostyryl phenol are placed in the mixer and mixed for 4 minutes. 60 parts of the same thermo-setting resin, as used in Example 1, are then added and mixing continued. No formation of dust is evident. Streaks, indicating non-uniform distribution, disappear after 3 to 5 minutes of mixing. When the mixture is placed on a 200 mesh screen and shaken, only 6 parts by weight (10%) of the resin originally present, pass the screen, indicating that most of the resin adheres firmly to and is evenly distributed with the sand.

The mixture of Example 2 is used for forming molds in the manner described in our application above referred to. Such molds are at least as strong as those produced with the previously known compositions and the molds and castings are very uniform.

Various mixtures of adhesion agents can be used, either of the compounds set forth above or of other compounds, within the scope of the invention. Preferably, however, the adhesion agent is a substance which either remains substantially unchanged in the finished mold or evaporates during the formation of the mold. It is at any rate preferable to use as an adhesion agent a substance which does not solidify under the conditions of the process. Mixtures of two substances, one or both of which are not liquids, may be used if the mixture is liquid at a temperature below the quick-setting temperature of the resin.

This application is a continuation-in-part of our application Ser. No. 135,316, for Making of Molds, filed December 27, 1949, now abandoned.

While we have described herein some embodiments of our invention, we wish it to be understood that we do not intend to limit ourselves thereby except within the scope of the claims hereto or hereinafter appended.

We claim:

1. A mold forming composition consisting essentially of a major proportion of sand and a minor proportion of a powdered thermo-setting resin, and an adhesion agent on the surface of the sand particles causing the resin to adhere thereto, said agent being liquid at a temperature below the quick setting temperature of the resin and containing a substantial proportion of at least one reaction product of phenol with a compound having a ring selected from the group consisting of aromatic and hydroaromatic rings and having an unsaturated side chain.

2. A composition as claimed in claim 1 in which the adhesion agent has a low vapor pressure.

3. A composition as claimed in claim 2 in which the adhesion agent is substantially more viscous than water.

4. A composition as claimed in claim 1 in which the adhesion agent is substantially more viscous than water.

5. A composition as claimed in claim 4 in which the adhesion agent is present in a quantity of about ¼% to 1% by weight of the sand and resin.

6. A composition as claimed in claim 1 in which the adhesion agent is present in a quantity of about ¼% to 1% by weight of the sand and resin.

7. A mold forming composition consisting essentially of a major proportion of sand and a minor proportion of a powdered thermo-setting resin, and an adhesion agent on the surface of the sand particles causing the resin to adhere thereto, said agent being liquid at a temperature below the quick setting temperature of the resin and containing a substantial proportion of at least one reaction product of phenol with styrene.

8. A composition as claimed in claim 7, in which the adhesion agent is present in a quantity of about ¼% to 1% by weight of the sand and resin.

9. A composition as claimed in claim 8, in which said reaction product is distyryl phenol.

10. A composition as claimed in claim 7, in which said reaction product is distyryl phenol.

11. A composition as claimed in claim 7, in which said reaction product is monostyryl phenol.

12. A composition as claimed in claim 1, in which the adhesion agent has a low vapor pressure, is substantially more viscous than water, and is of such character and in such quantity that the material is free flowing and non-balling and dry to the touch.

References Cited in the file of this patent

UNITED STATES PATENTS

| Number | Name | Date |
| --- | --- | --- |
| 1,963,253 | Upper | June 19, 1934 |
| 2,008,723 | Mills | July 23, 1935 |
| 2,083,719 | Kuzmick | June 15, 1937 |
| 2,111,248 | Novotny | Mar. 15, 1938 |
| 2,114,229 | Martin et al. | Apr. 12, 1938 |

OTHER REFERENCES

FIAT Final Report 1168 (7 pages).